Figure 1:
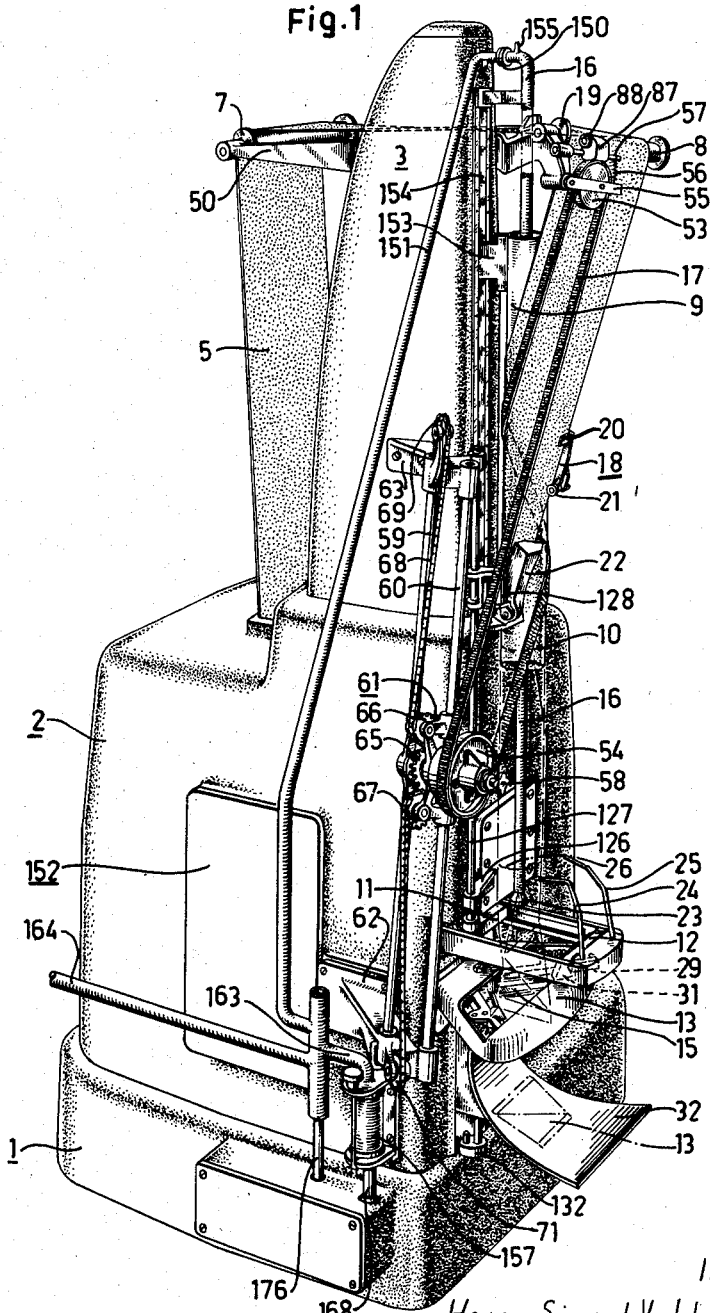

Jan. 8, 1963  H. S. V. JÄRUND  3,071,907
METHOD AND APPARATUS FOR THE PRODUCTION
OF TETRAHEDRON-SHAPED PACKAGES
Filed July 5, 1960  10 Sheets-Sheet 1

INVENTOR
Harry Sigurd Valdemar Jarund
By
Pierce, Scheffler & Parker
Attorneys

INVENTOR
Harry Sigurd Valdemar Jarund
By
Pierce, Schiffler & Parker
Attorneys

Jan. 8, 1963  H. S. V. JÄRUND  3,071,907
METHOD AND APPARATUS FOR THE PRODUCTION
OF TETRAHEDRON-SHAPED PACKAGES
Filed July 5, 1960  10 Sheets-Sheet 7

INVENTOR
Harry Sigurd Valdemar Järund
By
Pierce, Scheffler & Parker
Attorneys

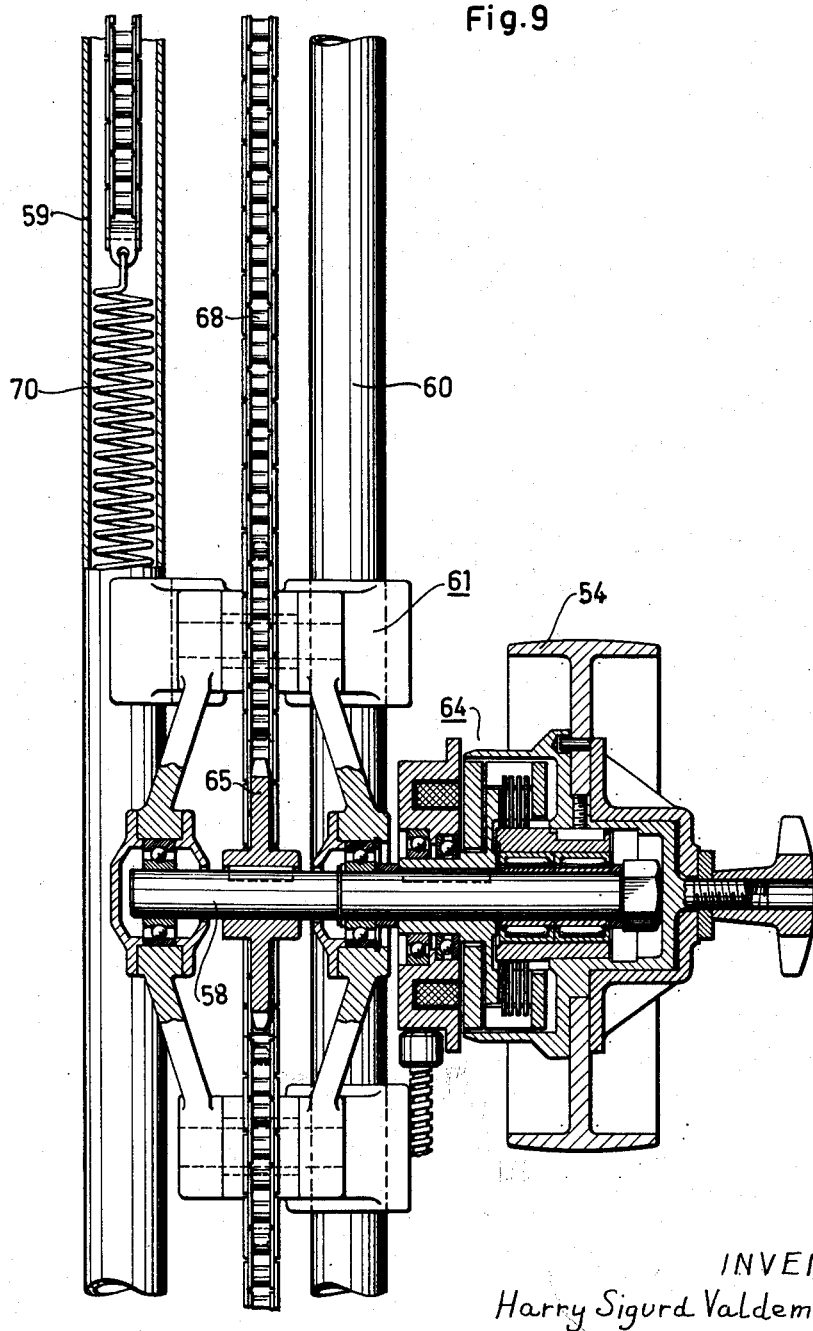

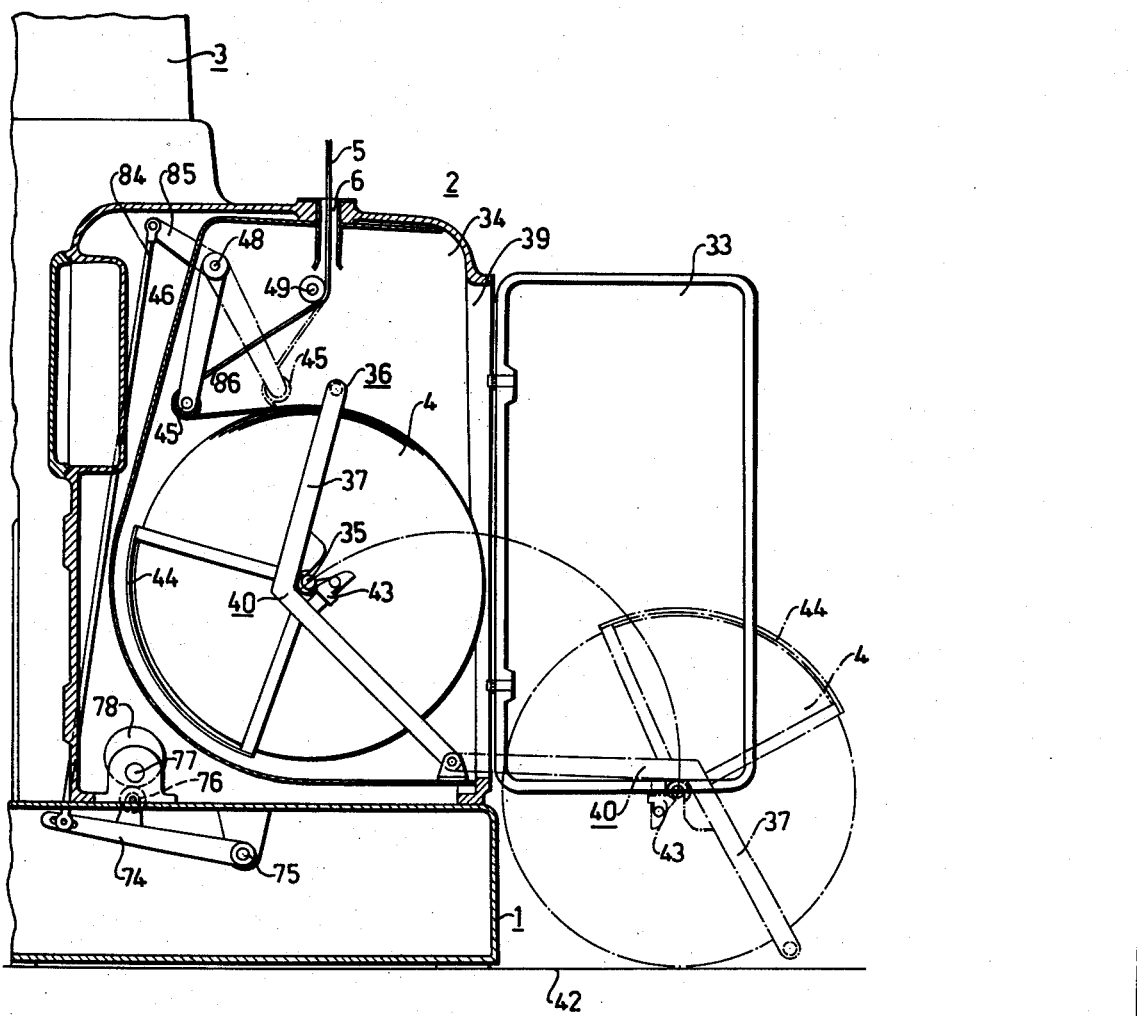

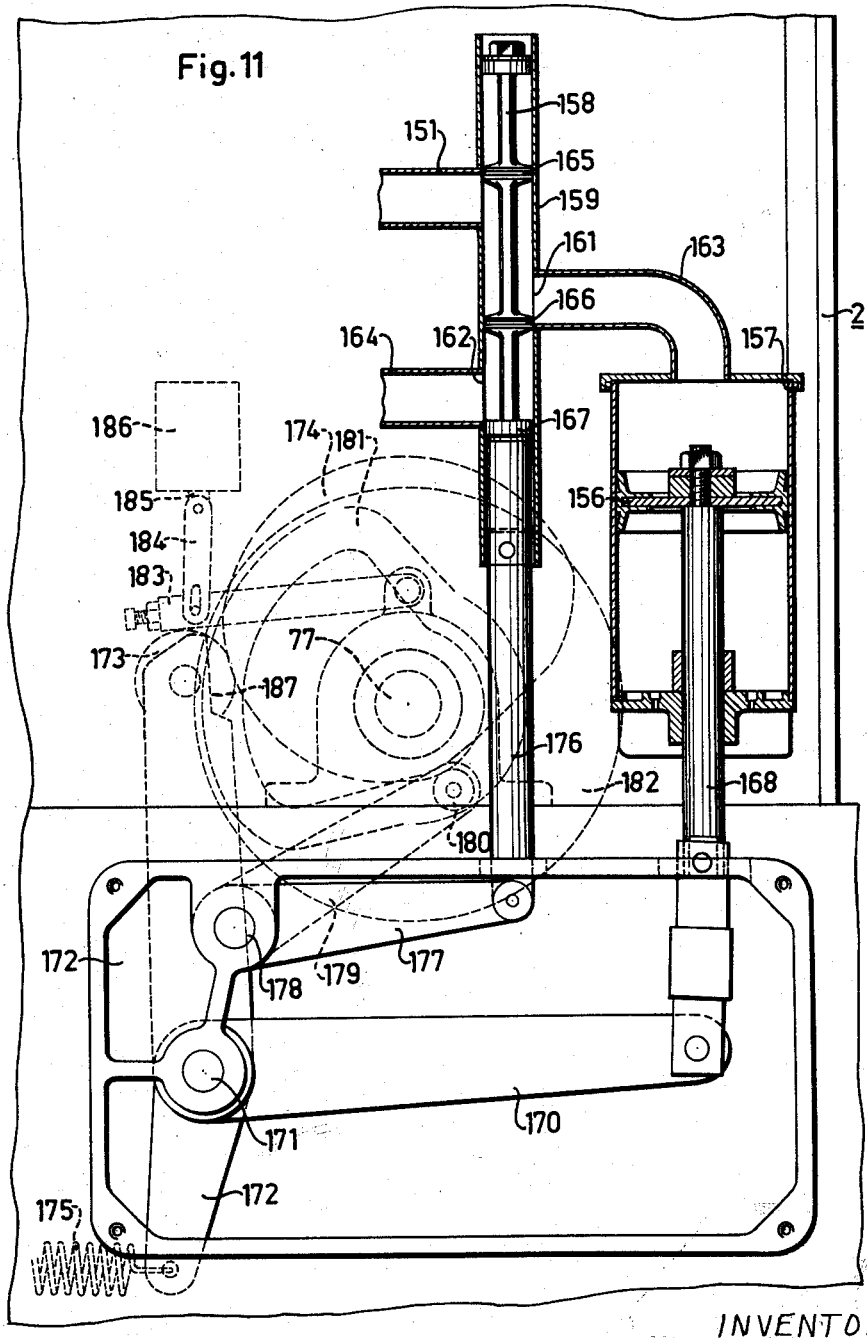

United States Patent Office 3,071,907
Patented Jan. 8, 1963

3,071,907
METHOD AND APPARATUS FOR THE PRODUCTION OF TETRAHEDRON-SHAPED PACKAGES
Harry Sigurd Valdemar Järund, Lund, Sweden, assignor to Hermorion Ltd., Toronto, Ontario, Canada, a company of Canada
Filed July 5, 1960, Ser. No. 40,733
Claims priority, application Sweden July 4, 1959
10 Claims. (Cl. 53—64)

The present invention relates to the art of producing tetrahedron-shaped packages and more particularly to a method of producing filled and sealed tetrahedron-shaped packages from a packaging web material by forming the material into a longitudinally seamed tube and compressing and sealing said tube along narrow transverse zones alternatingly in one and the other of two angularly displaced planes for enclosing a filling material quantity introduced into the tube in individual packages to be separated from the tube.

One method of producing tetrahedron-shaped packages of the type referred to contemplates that the packaging web material to be converted into a longitudinally seamed tube the longitudinal seam of which is parallel to the tube axis. Since successively being a web from a plane into a cylindrical configuration about an axis parallel to the longitudinal extension of the web will necessarily introduce heavy stresses in the web material if reasonable forming lengths are chosen, the prior art method mentioned will put the properties of the web material to a severe test in order that the package forming proper, i.e. the deformation of the tube into packages, must be carried out without causing undesired wrinkles or folds in the package walls.

In view of these circumstances it has been further suggested that the tube be produced through helically winding the packaging web material on a winding mandrel. Through the helical winding there is gained a relatively tension-free tube having a forming length substantially shorter than that necessary when producing a tube having a longitudinal seam extending along a tube generatrix. The resultant tube will substantially lack built-in stresses caused by the tube forming, and therefore the conversion of the tube into tetrahedron-shaped packages may be carried out without any substantial risk of extraneous wrinkling or folding even when choosing a packaging material in itself liable to such wrinkling and folding if used in the previously mentioned method.

According to the previous method the web is helically wound into tube shape on a cylindrical mandrel while simultaneously being axially displaced therealong. Thus, the tube performs both rotation about its own axis and a displacement aolng the mandrel. The tube rotation is adjusted to the tube displacement in such a way that the axial feeding length corresponding to the distance between two successive compressions of the tube will correspond to rotation of the tube through the angle enclosed between the two compression planes of a package, i.e. through 90° in case of a regular tetrahedron. Hence, when producing packages in an intermittent operation, the compression of the tube may be effected by one single pair of co-operating clamping jaws or the like taking part neither in the rotation of the tube nor in its axial displacement.

However, the realization of an intermittent operation, herein synonymous with intermittent rotation and displacement of the tube, has proved to involve difficulties. Since neither the web nor the tube produced therefrom may be broken through, if tight packages are to be produced, no positive driving thereof by e.g. toothed wheels or the like perforating the packaging material may be resorted to but only friction driving with the inherent risk of varying slip particularly at the starting moments of each operating cycle.

The method according to the invention indicates a solution to the combination of intermittent tube production and friction driving of the packaging material, the tube being controlled in such a manner that all winding turns of the helically wound tube in turn will pass along one and the same stationary helical path, and at each operating stroke being effected in response to the sensing of a predetermined packaging material dimension corresponding to tube length.

The sensing of the packaging material dimension may be carried out as a measurement of a certain distance along either the packaging web material or the tube already formed but might as well take the form of a sensing of successive indices appearing on the web or the tube.

In the following, the invention will be described in greater detail reference being made to the attached drawings.

Figure 2:
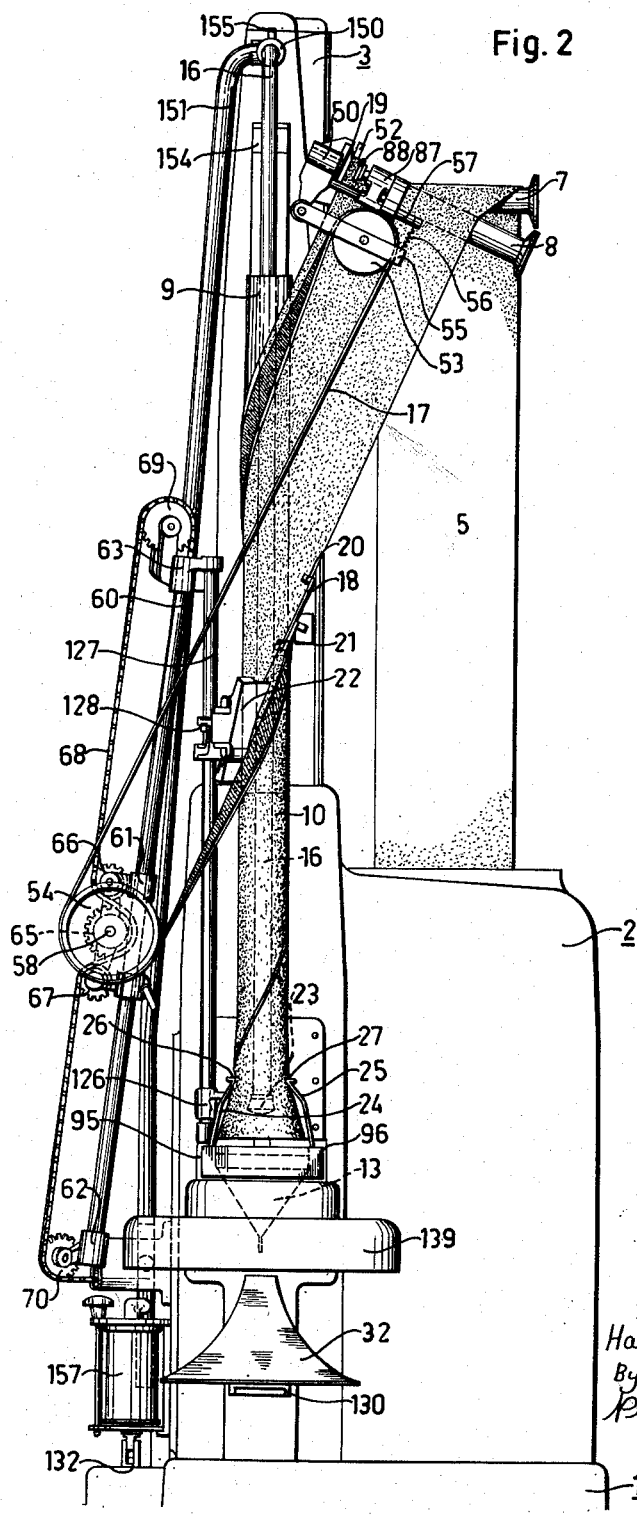
Figure 3:
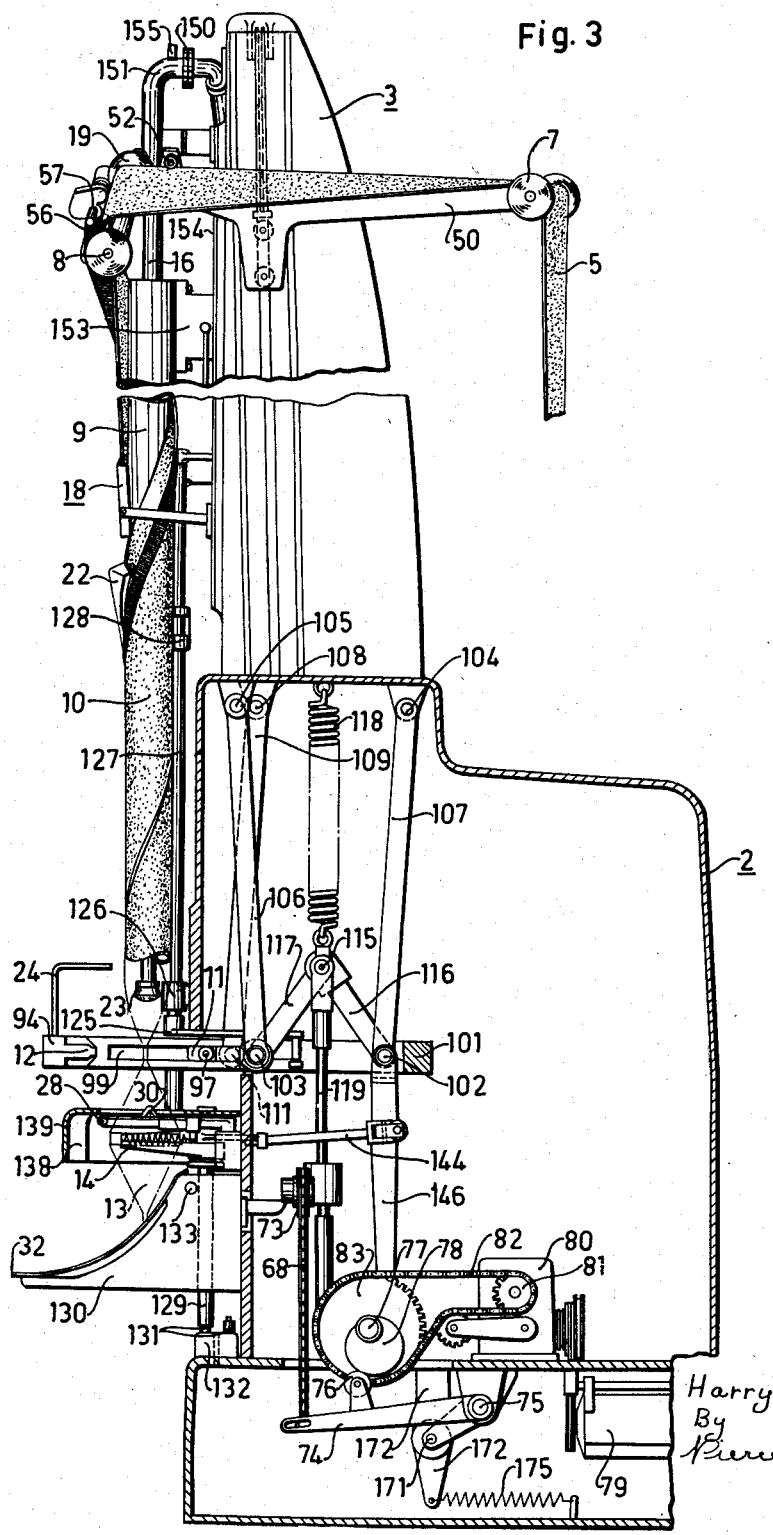
Figure 4:
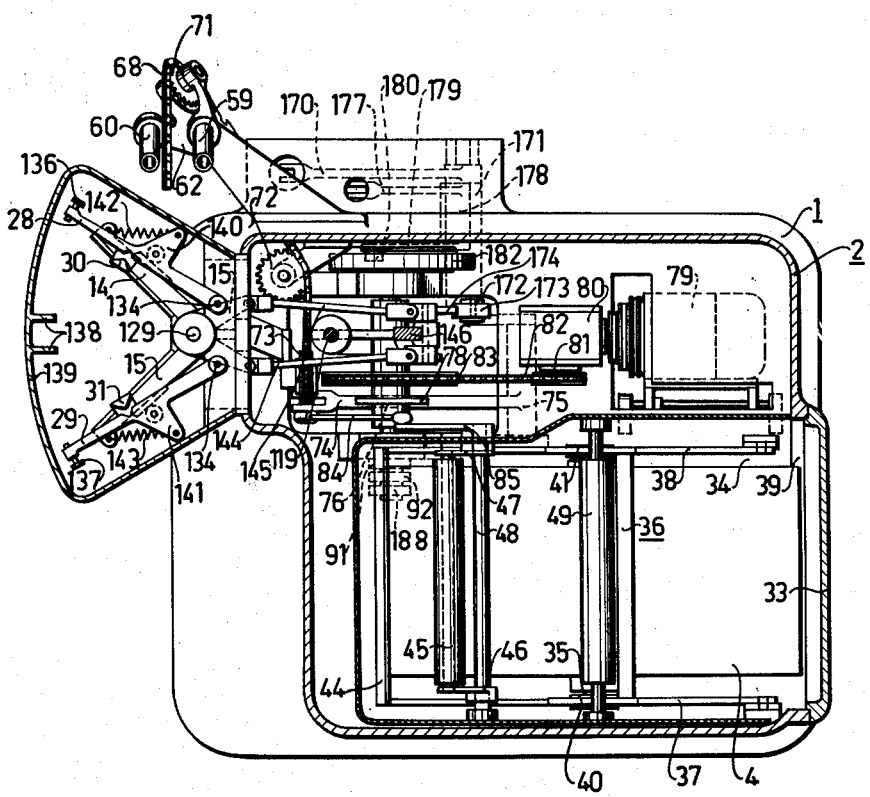
Figure 5:
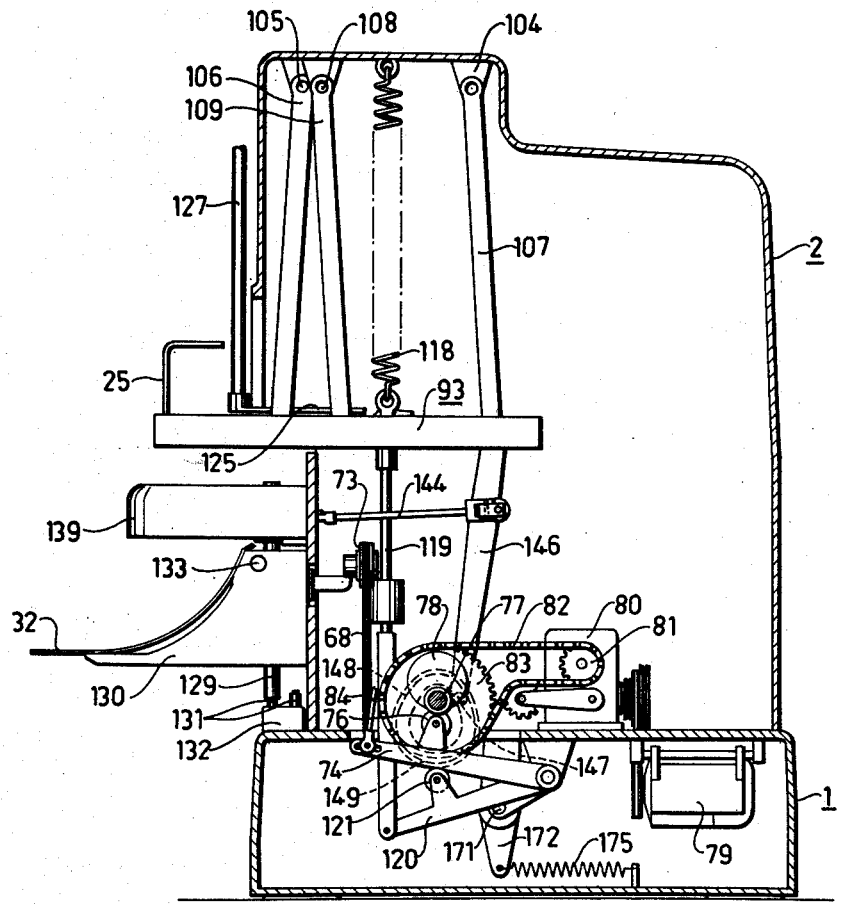
Figure 6:
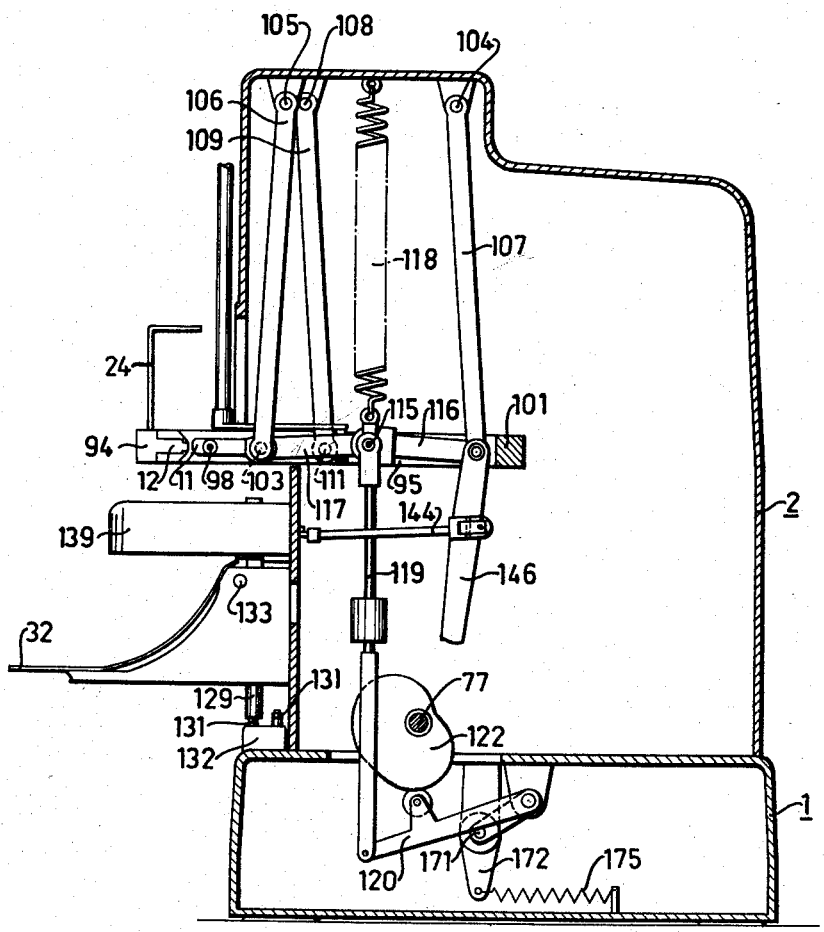
Figure 7:
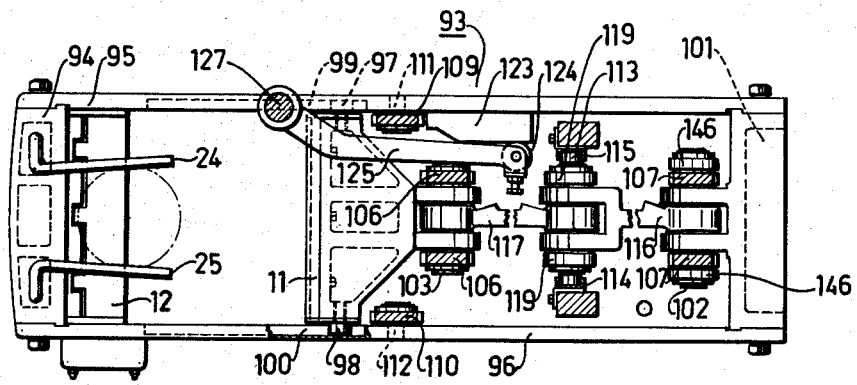
Figure 8:
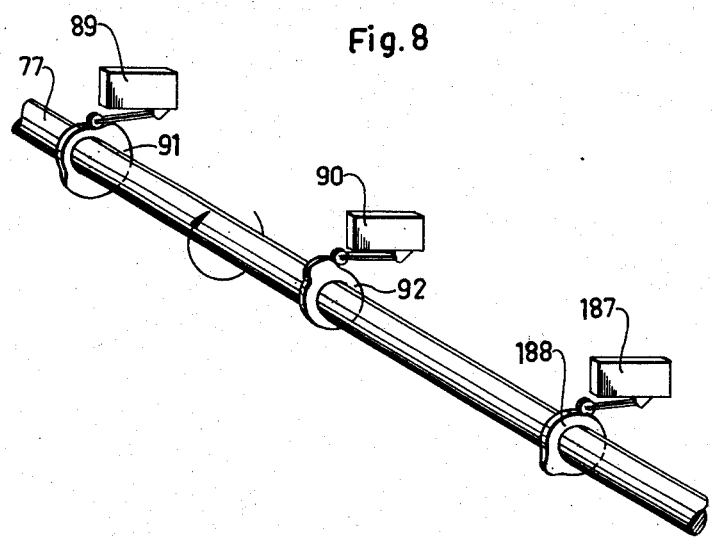

FIG. 1 is a perspective view of a machine for producing filled tetrahedron-shaped packages by the method according to the invention, FIG. 2 is a front elevation of said machine, while FIG. 3 is a side view, partially in section, as viewed from the right, FIG. 4 is a horizontal section along line IV—IV in FIG. 2, FIGS. 5 and 6 are side sectional views of the lower part of the machine along lines V—V and VI—VI, respectively, in FIG. 4, FIG. 7 is a plan view, partially in section, along line VII—VII in FIG. 6, FIG. 8 is an "exploded" detail view in perspective of three mechanically controlled electrical make contacts incorporated in the machine, FIG. 9 is a detail sectional view of a portion of the helical winding mechanism, FIG. 10 is a detail side view, partially in section, of the web unwinding part, and FIG. 11 is a detail side view, partially in section, of the pump mechanism.

The machine shown in the drawings is assembled in and on an encased frame on the whole comprising substantially three parts, viz. a base 1, a box-shaped body 2 resting thereon and a standard 3 extending upwardly from the body top and having its vertical front panel co-planar with the front panel of the body 2. The frame base 1 and the frame body 2 together accommodate the larger portion of the actuating mechanisms of the machine, the frame standard 3 mainly supporting machine parts external to the frame.

The frame body also provides space for a supply roll 4, shown in FIGS. 4 and 10, of a packaging web material 5, e.g. comprising a paper web coated on one side with a heat-sealable plastic material.

The web 5 is unwound from the supply roll 4 and passed through a slot 6 in the top panel of the frame body 2 from where it is passed over a substantially horizontal rear pulley roller 7 and an inclined front pulley roller 8 to a circular-cylindrical tube-shaped winding mandrel 9 attached to the front panel of the frame standard 3, on which mandrel it is wound helically in an overlapped manner into a vertical tube 10 having a tight helical longitudinal seam. As the winding operation proceeds the tube 10 is successively shifted downwardly and slid off the mandrel to be introduced between a pair of co-operating clamping jaws 11 and 12 by means of which the tube 10 is compressed along narrow transverse zones alternatingly in one and the other of two angularly displaced planes, thereby to be divided into tetrahedron-shaped packages 13, which are finally separated from the tube 10 by a pair of shear cutters 14, 15 at the package length below the clamping jaw pair 11, 12.

By means of a filling pipe 16 axially inserted through the mandrel 9 the filling material, e.g. liquid, is introduced into the tube 10 above said clamping jaw pair 11, 12.

For natural reasons the helical winding will also effect the axial downward shift of the tube 10. At least with respect to the tube forming, the package forming and the package separating operations the machine has an intermittent mode of operation comprising the steps of first winding helically and feeding a new tube portion corresponding to a package length and subsequently, while the tube is stationary, dividing the tube into a new package by compressing the tube and separating a previously formed package therefrom through cutting.

In the embodiment shown the helical winding of the web 5 into the tube 10 on the mandrel 9 is carried out by an endless belt 17, one run of which is passed in one winding turn about the mandrel 9, the web 5 being inserted between said belt run turn and the mandrel 9. By the front pulley roller 8 and a particular web guiding means 18, the web 5 is guided in such a way that it will engage the cylindrical surface of the mandrel 9 under an angle of about 24° to the axis thereof when producing substantially regularly tetrahedron-shaped packages. To this end the front pulley roller 8 is inclined the same angle to the horizontal plane and otherwise positioned in such a way in relation to the mandrel 9 that one longitudinal edge of the web 5 will engage and be guided by the end flange 19 of the upper end of the front pulley roller 8. The web guiding means 18 is situated below the front pulley roller 8 and in the vicinity of the mandrel 9. It co-operates with the other longitudinal edge of the web 5 and comprises a member 20 engaging the web edge and mechanically sensing the momentary position thereof, and a pair of guide rollers 21 positioned after said first-mentioned member 20 and being freely rotatable about an individual one of two shafts parallel to each other and to the guiding zone of the web 5 and being contained in a plane perpendicular thereto co-operatingly to engage opposite faces of the web 5.

The guiding provided by the front pulley roller 8 and the web edge guiding means 18 will cause every winding turn of the tube 10 to pass through exactly the same helical path as the next-preceding turn. This will allow the belt 17 to enclose a slightly larger angle, e.g. about 25.5°, when producing substantially regular tetrahedron-shaped packages, with the axis of the mandrel 9, than the web 5, and hence to have a slightly less pitch than the winding turns of the finished tube 10, which is favourable from a winding point of view. The reason is that the winding turns of the finished tube 10 tend to increase their diameter successively in spite of the mandrel 9, if the belt 17 have the same pitch as the winding turns of the tube 10.

Through the positive guiding of the web 5 and the constant tube diameter ensured through the pitch of the belt 17 the overlapping winding turn edges of the tube 10 may be sealed to each other by a seaming element 22 stationary longitudinally of the mandrel 9 but movable toward and from the same, said element 22 being arranged by a helical surface corresponding to the overlapping zone of the winding turn edges from the outside to apply pressure and transfer heat to an overlapping zone length slightly exceeding the one corresponding to one package length. With respect to the seaming element 22 the mandrel 9 serves as a counter-pressure means therefor, the pressure exerted between the mandrel 9 and the seaming element 22 being correlated to the heat transferred from the element 22 so that in the present case the winding turn edges are heat-sealed to each other the plastic coating of the web serving as an adhesive. Thus, the tube 10 fed downwardly step-by-step off the mandrel 9 through the helical winding operation has a continuous helical longitudinal seam ensuring tightness of the tube 10.

When moving downwards, the tube 10 is introduced between the clamping jaws 11 and 12 horizontally movable towards and from a plane through the axis of the tube 10 and parallel to the front face of the machine. In a conventional manner the clamping jaws 11 and 12 are arranged by their co-operating pressure surfaces between themselves to flat-press the tube 10 along a narrow transverse zone and to transfer heat thereto thereby to effect heat-sealing of the plastic coating of the tube inside.

Since the flat-pressing of the tube 10 between the clamping jaws 11 and 12 will reduce its actual length between the lower end of the circular-cylindrical surface of the mandrel 9 and the clamping jaws 11 and 12 the latter are arranged, when performing their sealing movement, to be raised towards the mandrel 9 for compensating the tube length reduction. Through such compensation the stresses otherwise occurring in the packaging material are avoided, said stresses obstructing or even preventing proper package forming.

Between two successive transverse sealing operations the tube 10 is rotated through an angle corresponding to the desired spacing of two consecutive transverse sealing zones, i.e. through 90° in the present case, and therefore the transverse sealing operations will be effected in angularly displaced planes. Rotating the tube 10 through 90° between two successive transverse sealing operations will, of course, position the transverse seals alternatingly in one or the other of two perpendicular planes, while tube rotation through other angles will cause the transverse seals to be contained in other planes having other angular relationships.

At a distance corresponding to the desired package length below the clamping jaws 11 and 12 in their raised or lifted position there is the sheer cutter pair 14, 15 which is arranged in the closed position of the clamping jaws 11 and 12 and by a cut in the next-preceding transverse sealing zone, to separate a sealed package 13 from the tube 10. To this end the shear cutters 14 and 15 are horizontal and arranged by swinging towards each other to cut along a line in a plane through the axis of the tube 10 and parallel to the closing direction of the clamping jaws 11 and 12. At least greater deviations from right-angled relationship of the planes of the successive transverse seals the cutting line should, of course, be movable correspondingly.

Through the filling pipe 16 the filling material is supplied to the tube 10 sealed closed at its lower end. The supply may be either continuous or intermittent. In the first case each package dividing transverse sealing operation effected by the clamping jaws should be carried out below the filling material level in the tube 10, while in the latter case the transverse seals are produced above each fill or charge.

To facilitate intermittent filling the column of filling material in the filling pipe 16 and in the supply line connecting thereto should be unbroken even during the interval between two successive filling operations. To this end the discharge opening of the filling pipe 16 of the intermittently filling embodiment of the machine according to the invention is provided with a means 23 serving as a non-return valve. In its simplest form said means comprises a flaring mouth portion of the filling pipe in the discharge opening of which there is mounted a strainer disc. The strainer disc is of a mesh matched to the filling material so that, when the feeding pressure in the supply line and the filling pipe 16 ceases, the filling material column above the strainer disc will be kept "suspended" in the filling pipe 16 without even escaping drop-by-drop through the strainer disc.

Since the clamping jaws 11 and 12 are situated at a distance substantially exceeding the actual package length below the lower end of the circular-cylindrical winding mandrel 9, the deformation of the tube produced by closing the clamping jaws 11 and 12 will occur without any substantial tendencies towards the creation of undesired cracking folds or other folds in the tube wall as concerns that tube portion situated between the mandrel 9 and the clamping jaws 11 and 12. On the other hand, depending upon the stiffness of the packaging material and other important properties thereof more or less pronounced tendencies of this kind will appear when deforming the tube portion below the clamping jaws 11 and 12 into the final package shape. The reason is that the transverse sealing, through which the package 13 is closed, is effected in a plane angularly displaced to that of the next-preceding transverse seal, and therefore the last mentioned tube portion will have its oval cross-section rotated through an angle corresponding to the angle between the sealing planes, i.e. 90° in the present case, such rotation giving rise to stresses in the tube portion wall.

To prevent injurious cracking folds from occurring along the package body proper e.g. the front clamping jaw 12 may carry two upright folding horns 24 and 25 symmetrically positioned on opposite sides of a plane through the tube axis and perpendicular to the front face of the machine, said folding members being arranged during the closing movement of the clamping jaw 12 to buckle the tube 10 inwardly from each side along an individual one of two horizontal lines parallel to said plane and substantially at the package length above the clamping jaws 11 and 12 thereby to effect two linear relatively shallow folds 26 and 27 in the tube 10. In this manner the inevitable cracking folds in the package wall material caused when converting from tube into tetrahedron-shape are locatable to the transverse sealing zones.

A further advantage gained by the folding horns 24 and 25 is that the tube 10 is caused to pass smoothly from circular-cylindrical into flattened oval shape towards the clamping jaws 11 and 12 instead of tending to maintain its circular-cylindrical shape as far as possible below the mandrel 9 in which case there will result sharp transition folds at the ends of the clamping jaws 11 and 12. The transition folds cause, in the transverse seal produced by the clamping jaws 11 and 12 and not yet completely stabilized, stresses too great in the direction corresponding to separating the tube walls.

During its combined downward shift the tube 10 will be introduced between both the previously mentioned shear cutters 14 and 15 and supporting members 28 and 29 actuated thereby. In their clamped position said supporting members 28 and 29 by reason of individual inclined supporting surfaces 30 and 31 thereon, respectively, press against individual opposite tetrahedron sides being formed for opposing any outward bulging of the tetrahedron sides due to the weight of the filling material. Thus, the supporting members 28 and 29 in general are of great importance to the tetrahedron forming and, in the case where there is a continuous supply of filling material into the tube 10, they can also take over the metering function since they determine the package volume by determining the positions of the tetrahedron side faces.

When severed from the tube 10 the finished package 13 drops onto a curved plate 32 serving as a chute leading to take off station where the package, either manually or automatically, is packed for distribution.

Next the machine embodiment shown in the drawings will be described more thoroughly both as to the constructive details thereof and their co-operation.

As apparent particularly from FIGS. 4 and 10, the frame body 2 is provided with a separate casing 34 closable by a door 33 for the supply roll 4. In such casing 34 the roll 4 is carried on a horizontal spool shaft 35 journalled in a generally U-shaped carrier 36 the two legs 37 and 38 of which for swinging in a vertical plane have their free ends hinged to the casing floor in the vicinity of the lower edge of the door opening 39, thereby to make possible rocking the carrier 36 out through the door opening 39 from a working position determined by the hinges into a roll replacing position illustrated by dot and dash lines in FIG. 5. In such position the spool shaft bearings 40 and 41 of the carrier 36 are situated on that side of the legs 47 and 48 facing the machine supporting plane 42. The spool shaft bearings 40 and 41 are open in the corresponding direction and provided each with a snap latch 43 for allowing insertion of the spool shaft 45 into the bearing and for retaining the same therein until the snap latch 43 is moved out of locking position in opposition to spring action.

Through this design and arrangement of the carrier 36 and its spool shaft bearings 40 and 41 the carrier 36, when effecting a roll change, may be swung downwardly in over a roll 4 provided with a spool shaft 35 and in advance placed in the proper position in front of the door opening 39, thereby to cause the spool shaft 35 automatically to snap into the bearings 40 and 41, so that the carrier 36 may be subsequently swung back into its operative position inside the casing 34.

For joining the trailing end of a web 5 unwinding from a supply roll 4 to the leading end of a new supply roll 4 the upper side of the carrier 36 in outswung position carries a plate 44 serving as a joining work table and being curved along a cylindrical surface coaxial with the supply roll 4 in the mounted position thereof and being of a radius slightly exceeding the largest supply roll radius.

The packaging web material 5 of the roll 4 is passed below a horizontal pulley roller 45 situated above the supply roller 4 and beyond the spool shaft 35 in operative position as viewed from the door opening 39, said pulley roller being rotatably mounted between the free ends of two depending rocking levers 46 and 47 the opposite ends of which are rigidly secured to a horizontal shaft 48 journalled for rotation in the frame body 2. From said pulley roller 45 the web 5 is passed under a horizontal pulley roller 49 rotatably supported in the frame body 2 substantially vertically above the spool shaft 35 in operative positon and just below the slot 6 in the top panel of the frame body 2. The pulley rollers 45 and 49 are both parallel to the spool shaft 35.

From the pulley roller 49 the web 5 is passed through the just-mentioned slot 6 up to and over the rear pulley roller 7 and further on over the inclined front pulley roller 8. The pulley rollers 7 and 8 are rotatably supported in one and the same bracket 50 adjustably secured to an inclined guideway 51 on one side of the standard 3. From the front pulley roller 8 the web 5 is inserted between the helical winding turn of the belt 17 and the mandrel 9.

In the embodiment shown in the drawings it has been assumed that the longitudinal seam of the tube 10 is of the so-called "over-turned" or back seam type, i.e. that the overlapping web margins are sealed to each other web inside to web inside (plastic face to plastic face in the present case). For this purpose, therefore, the requirement is that the web 5 before being helically wound is folded over upon itself at a distance from the margin in question substantially corresponding to the overlapping width of the longitudinal seam to be produced. For this purpose, the web 5 is first provided with a score line defining the margin in question to be over-turned, and subsequently said margin, while the web 5 except for said margin is substantially perpendicular to a plane and the score line is maintained in such plane, is folded about the score line by a component of an external force, said component being parallel to said plane. For maintaining the score line in said plane the web 5 is laterally guided thereto while simultaneously being provided with the score line, and furthemore the web 5, for completing the margin folding initiated by said external force, is successively over-turned with the prefolded margin facing upwardly so that the web portion excluding the web margin in question will assume a single-curved shape.

In the present case the folding means comprises a combined web guiding and scoring means 52 positioned in front of the front pulley roller 8 and pivoted to the bracket 50, said member 52 being of substantially the same construction as the perviously described web guiding means 18, the two rollers engaging opposite faces of the web 5 being provided with an annular scoring ridge and a corresponding angular groove, respectively, as well as the pulley roller 8 and the end flange 19 thereof, said latter parts initiating and completing the overturning of the web margin about the score line produced by the web guiding means 52 and maintained substantially in that plane perpendicular to the axis of the pulley roller 8 and passing through the intersection between the inner face of the end flange 19 and the cylindrical surface of the pulley roller 8.

The belt 17 is passed over two pulleys 53 and 54, the upper pulley 53 being mounted for rotation in a stirrup 55 one end of which is pivoted to the bracket 50. By a tension spring 56, the opposite free end of the stirrup 55 is connected to the free end of a spindle 57 secured to the bracket 50 above the stirrup 55, and therefore the downward swinging of the pulley stirrup 55 must be carried out in opposition to the action of the spring 56.

As shown in FIG. 9, the other, lower pulley 54 is mounted on a shaft 58 which in turn is rotatably supported in a carriage 61 adjustably movable along two parallel circular-cylindrical guiding tubes 59 and 60 are secured to a bracket 62 on one side panel of the frame body 2 their upper ends being secured to a bracket 63 on the corresponding side panel of the frame standard 3.

To the lower pulley 54 there is rigidly connected one half of an electromagnetic clutch 64 the other half of which is fixed to the shaft 58. Supply of current to the magnetic coil of the clutch 64 engages the two clutch halves, and therefore the pulley 54 which is otherwise freely rotatable on the shaft 58 will be rigidly connected thereto.

A sprocket 65 is rigidly secured to the shaft 58. In the same plane as and above and below, respectively, said sprocket 65 two pulley sprockets 66 and 67 are mounted for free rotation in the carriage 61. Above said pulley sprockets 66 and 67 as well as below the sprocket 65 on the shaft 58 there is passed a chain length 68 the upper portion of which is passed over a pulley sprocket 69 mounted for free rotation in the upper guiding tube bracket 63 and into one guiding tube 59. Inside said guiding tube 59 the corresponding chain end is connected to the upper end of a tension spring 70 enclosed in the guiding tube 59 and at its lower end secured to the lower portion thereof.

From the lower pulley sprocket 67 on the carriage 61 and via a pulley sprocket 71 mounted for free rotation on the lower guiding tube bracket 62 the chain 68 is introduced into the frame body 2 where it is passed first over a pulley sprocket 72 mounted for free rotation on a fixed vertical shaft and then over a pulley sprocket 73 mounted for free rotation on a fixed horizontal shaft and is finally passed downwardly into the frame base 1 where the corresponding chain length end is connected to the free end of a substantially horizontal lever 74 pivoted to a horizontal shaft 75 mounted in the base, as apparent from FIGS. 3, 4 and 5. On its top face and at a point intermediate its two ends the lever 74 carries a cam follower roller 76 co-operating with a cam disc 78 secured to the main drive shaft 77 of the machine. The shaft 77 is constantly driven from an electric motor 79 through a speed variator 80 the output shaft of which carries a drive sprocket 81 which, by an endless chain 82, is connected to a sprocket 83 secured to the shaft 77.

As particularly shown in FIGS. 4, 5 and 10, a link rod 84 connects the free end of the lever 74 also to the free end of a lever 85 secured to the previously mentioned shaft 48 so that swinging the arm 77 downwardly will swing the levers 46 and 47 and hence the pulley roller 45 inside the casing 34 towards the door opening 39 into the position shown by dash lines in FIG. 10. The tension spring 70 inside the guiding tube 59 will maintain the chain 68 stretched and the cam follower roller 76 in engagement with the cam disc 78.

Each revolution of the cam disc 78 will swing the lever 74 downwardly from an upper to a lower end position and back again. The upward return swinging, which takes place at a time when the tube 10 is stationary and through the action of the returning force of the spring 70, swings the pulley roller 45 from its position closer to the casing door opening 39 to its position remote therefrom and unwinds from the supply roll 4 a web loop 86 corresponding to one winding operation of the belt 17. During the return movement of the chain 68 caused by the action of the spring 70 the two halves of the magnetic clutch 64 are disengaged.

Just below the front pulley roller 8 the spindle 57 carries a web length measuring means 87 having a measuring wheel 88 in non-slipping engagement with the web 5 on the pulley roller 8. During the helical winding operation the web 5 causes the measuring wheel 88 to rotate in correspondence to the web feed. The measuring wheel 88 has such an operative circumference and is operatively connected in such a way to a break contact inside the means 87 and in circuit with the magnetic coil of the magnetic clutch 64 that, upon advancing a web length corresponding to the desired package length, said break contact will open the holding circuit of the magnetic clutch 64 hence disengaging same and stopping the winding operation. The feed of the chain 68 is preferably adjusted in such a manner that the chain 68 will continue the rotation of the shaft 58 even slightly after disengaging the belt pulley 54 from the shaft 58.

Connected in series and parallel, respectively, with the break contact of the web length measuring means 87 are a microswitch 89 and a microswitch 90 both operated from each an individual one of two cam discs 91 and 92, respectively, on the machine main shaft 77. The cam discs 91 and 92 are shaped in such a way as to maintain the microswitch 89 open during the entire return stroke of the chain 68 effected by the spring 70, while closing the microswitch 90 for a short period of time for initiating a new helical winding operation. As soon as such winding operation has been initiated by the microswitch 90 the break contact operated by the measuring wheel 88 will close and take over the control of the current supply to the magnetic clutch 64.

Of course, the belt 17 may be driven by other drive mechanisms than the pull chain mechanism shown in the drawings and recently described, which pull chain mechanism should only be considered as an embodiment not limiting the scope of the invention. On the other hand, with regard to the helical winding, a feature of the present invention is that the helical winding operation is carried out in response to measuring a distance along either the web 5 or the tube 10 already formed therefrom or the spacing between two successive indices or register marks preapplied onto the web 5 or the tube 10.

In case the helical winding is not effected by a helical winding belt but instead by the above mentioned expanding shiftable mandrel the presently described belt drive mechanism may be modified according to those requirements put by an expanding rotatable and shiftable winding mandrel.

As particularly apparent from FIG. 5 and FIG. 6 the clamping jaws 11 and 12 are carried in a rectangular, horizontal frame 93 the longitudinal dimension of which is perpendicular to the front panel of the machine frame and one short-side of which together with the adjacent portions of the two long-sides projects out of the machine frame body 2. The front jaw 12 is secured to the inside of the outer frame short-side 94, the inner clamping jaw 11 being slidable along the frame long-sides 95 and 96. To this end the clamping jaw 11, along its corresponding sides, is provided with two co-axially mounted rollers 97 and 98 being arranged to roll along each an individual one of two rolling grooves 99 and 100, respectively, in the frame long-sides 95 and 96.

The remaining frame short-side 101 and the inner clamping jaw 11 carry, on their facing sides, horizontal pivots 102 and 103, respectively, perpendicular to the frame long-sides 95 and 96. On the ceiling of the machine frame body 2 there are provided two horizontal pivots 104 and 105 parallel to the machine front panel and having a spacing substantially corresponding to that of the pivots 102 and 103 in the completely separated position of the clamping jaws 11 and 12. The pivots 104 and 105 are on the same level in the machine, said level substantially corresponding to the lower end of the mandrel 9.

On the front stationary pivot 105 is pivotable one end of a depending supporting arm 106, the other end of which is hinged to the pivot 103 on the inner clamping jaw 11. The pivots 105 and 102 are similarly connected to each other by a second supporting arm 107 of the same length as the supporting arm 106.

Between the fixed pivots 104 and 105 and at a point closer to the front pivot 105 there is a fixed spindle 108 parallel to the two fixed pivots 104 and 105 and situated on the same level. On said fixed spindle 108 two depending supporting arms 109 and 110 of equal lengths are swingable by one end thereof. At their respective opposite ends said supporting arms 109 and 110 hinged to each are an individual frame long-side 95 and 96, respectively, through each an individual one of two coaxial pivots 111 and 112.

In a guiding means comprising two vertical U-shaped plates a horizontal pivot 115 is shiftable from an upper position corresponding to completely separated clamping jaws 11 and 12, in which position it is situated above the clamping jaw frame 93, and to a lower position corresponding to closed clamping jaws and substantially on the same level as the clamping jaw frame 93. The vertical guiding means is positioned centrally between the vertical planes through the two fixed pivots 104 and 105. By two links 116 and 117 the movable pivot 115 is connected to the pivot 102 on the jaw frame short-side 101 and the pivot 103 of the inner clamping jaw 11, respectively. The movable pivot 115 is connected to the lower end of a tension spring 118 the upper end of which is fixed to the ceiling of the machine frame body 2. Furthermore, it is rotatably connected to the upper end of a depending pull rod 119 the opposite end of which is hinged to a lever 120 pivoted to the shaft 75 in the machine frame base 1, said lever 120 on its upwardly facing side carrying a cam follower roller 121 co-operating with a cam disc 122 on the machine main shaft 77.

When, in correspondence with the shape of the rotating cam disc 122, the lever 120 swings downwards from its uppermost position, the pull rod 119 will shift the movable pivot 115 vertically downwards in the guiding plates 113 and 114 in opposition to the action of the tension spring 118. This will make the toggle links 116 and 117 to separate the inner jaw frame short-side 101 from the inner clamping jaw 11 until the shaft 115 reaches its lowermost position in which it is situated in substantially the same plane as the pivots 102 and 103 of the jaw frame short-side 101 and the inner clamping jaw 11, respectively. The relative movement of the jaw frame short-side 101 and the clamping jaw 11 will result in an oppositely directed relative movement between the outer jaw frame short-side 94 and the inner clamping jaw 11, i.e. between the two clamping jaws 11 and 12. Owing to the construction of the suspension and operating mechanism the reciprocating movement of the clamping jaws 11 and 12 is symmetrical to a vertical plane through the axis of the tube 10. Similarly, the clamping jaw frame 93 is constantly maintained substantially horizontal. On the other hand, as it is suspended from the supporting arms 107 and 109, the closing of the clamping jaws will slightly raise the clamping jaw frame from its position corresponding to completely separated clamping jaws 11 and 12. Said lifting will correspond substantially to the "length reduction" of the tube material below the lower end of the mandrel 9 caused by the flat-pressing of the tube 10 by the clamping jaws 11 and 12 and will eliminate such axial tension stresses in the tube 10 that would otherwise cause an undesired tendency towards displacing the tube 10 out of its axial position along the mandrel 9.

Between the inner jaw frame short-side 101 and the inner clamping jaw 11 in the normal inoperative position thereof there is provided a cam 123 secured to the inside of one jaw frame long-side 95. Said cam is arranged to co-operate with a cam follower roller 124 mounted for rotation on one end of a crank arm 125, the other end of which being secured to a vertical shaft 127 journalled in the guide way bracket 63 as well as in a bearing lug 126 on the front panel of the machine. To said shaft 127 is adjustably secured a holder 128 carrying the seaming element 22. As mentioned above, the seaming element 22 has a helical working surface the shape and extension of which corresponds to the helical longitudinal seam of slightly more than a package length of the tube 10. The seaming element 22 is equipped with means for generating sealing heat in the longitudinal seam zone when pressing the element 22 into engagement therewith.

The closing movement of the clamping jaws 11 and 12 will move the cam 123 relatively to the follower roller 124. This relative movement will finally carry the cam 123 inwardly towards the jaw frame long-side 95 in turn resulting in an inward swinging of the seaming element 22 towards the mandrel 9 into working position. When separating the clamping jaws 11 and 12 the seaming element 22 will again swing away from the mandrel 9 into its normal position. Preferably, the cam follower roller 124 is maintained in constant engagement with the cam 123 by a return spring not shown.

Particularly when helically winding tubes having a so-called back seam substantially increasing the outer radius of the tube 10 in the seam region, it may be feasible, for facilitating the positive guiding of the tube 10 along the mandrel, to provide the operating surface of the mandrel 9 with a helical groove corresponding ot the longitudinal seam and being of a depth corresponding to the tube wall thickness increase caused by the longitudinal seam.

As described above, the shear cutters 14 and 15 as well as the supporting members 28 and 29 operated thereby are at a level below the one corresponding to the clamping jaws 11 and 12 on the machine front panel. The shear cutters 14 and 15 have the form of two substantially congruent shear shanks mounted for free rotation on a vertical spindle 129 at a point intermediate their respective ends, said spindle 129 being inserted through a supporting bracket for the chute plate 32 and having its lower end resting on one of a plurality of studs 131 of unequal heights on a turret 132. The spindle 129 is lockable to the supporting bracket 130 by an eccentric 133. The shown arrangement of a revolving turret 132 and stop studs 131 mounted thereon for the spindle 129 purports to illustrate an embodiment of a device for setting the working level of the shear cutters 14 and 15, thereby to make possible severing a finished package 13 at a distance corresponding to the package length below the clamping jaws 11 and 12 in their raised working position.

In a horizontal plane above the shear cutters 14 and 15 said supporting members 28 and 29 are each rockable about an individual pivot 134 and 135, respectively, secured to the machine frame body 2. The pivots 134 and 135 are situated slightly behind and symmetrically to the spindle 129 and carry one end of the respective supporting members 28 and 29. At their opposite ends the supporting members 28 and 29 are each provided with an adjustable set screw 136 and 137, respectively, being arranged, when swinging the supporting members 28 and 29 towards each other, to engage a stop 138 of a shield 139 enclosing the shear cutters 14 and 15 as well as the supporting members 28 and 29.

About centrally between their two ends the supporting members 28 and 29 are each provided with an individual one of two oppositely directed shoulders 140 and 141 the free ends of which are connected to the outer ends of the respective adjacent shear cutters 14 and 15, respectively, through a tension spring 142 and 143, respectively.

Two pull rods 144 and 145 each link an individual one of the inner ends of the shear cutter shanks 14 and 15, respectively, to a common point along a depending lever 146. The upper end of the lever 146 is rotatable about the pivot 102 of the inner jaw frame short-side 101 and the opposite lever end carries a cam follower roller 147 co-operating with a positively guiding groove 148 in a cam disc 149 on the machine main shaft 77.

When closing the clamping jaws 11 and 12 the rear jaw frame short-side 101 and hence the pivot 102 thereof are shifted rearwards, i.e. in the direction from the machine front panel. This shift will move the upper end of the lever 146 in the same direction resulting in a pulling force in the pull rods 144 and 145 causing the cutting portions of the shear cutters 14 and 15 to swing towards each other. The position of the fulcrum of the pull rods 144 and 145 along the lever 146 is chosen so as to make the rearward swinging of the lever 146 about the spindle of the cam follower roller 147 caused by closing the clamping jaws 11 and 12 close the shear cutters 14 and 15 into a position in which yet no cutting occurs. On the other hand, the supporting members 28 and 29 are swung completely into their respective working positions in which their set screws 136 and 137 rest on the stop 138.

For cutting through a transverse sealing zone of the tube 10 the shear cutters 14 and 15, starting from their intermediate position, are closed completely in response to the lever 146 being swung further rearwardly by the guiding groove 148, said further rearward swinging this time being about the pivot 102 of the rear jaw frame short-side 101. Closing the shear cutters 14 and 15 from their intermediate to their cutting position will tension the springs 142 and 143 without further closing the supporting members 28 and 29.

The shear cutters 14 and 15 as well as the supporting members 28 and 29 are returned to their respective swung-away normal positions through the action of the return spring 118 of the clamping jaw mechanism, the guiding groove 148 of the cam disc 149, and the springs 142 and 143.

If the transverse seals produced by the clamping jaws 11 and 12 are not horizontal, i.e. perpendicular to the tube axis, the shear cutters 14 and 15 should, of course, cut along a correspondingly inclined or oblique cutting line. In the machine shown in the drawings, the successive transverse seals are assumed to be contained in alternatingly one and the other of two substantially perpendicular planes, and therefore the shear cutters 14 and 15 are to cut along a line contained in a plane perpendicular to the sealing plane of the clamping jaws 11 and 12. However, should the angle between two successive transverse seals differ substantially from 90° the shear cutters 14 and 15 should be arranged to cut in planes correspondingly angularly displaced, which may imply that the entire cutting device including the supporting members 28 and 29 should be angularly displaced into the respective cutting planes between two successive cutting operations.

In the vicinity of the top of the machine frame standard 3 the filling pipe 16, by a flange coupling 150 in a plane parallel to the machine front panel, is connected to a supply line 151 the lower end of which is connected to the outlet of a pump 152. The turnable flange coupling 150 is such as to permit the filling pipe 16 to be swung-away laterally from the working position thereof without necessitating disconnection of the filling pipe 16 from the supply line 151. The lateral swinging-away of the filling pipe 16 is necessary when replacing or otherwise removing the mandrel 9. The mandrel 9 is provided with a socket 153 insertable in a vertical guideway 154 on the front panel of the machine frame standard 3.

In the vicinity of the flange coupling 150 either the supply line 151 or the filling pipe 16 (the filling pipe 16 in the present case) is provided with a valve means 155 which, due to its construction and to its location in the highest point of the supply system 151, 16 permits any gas to escape out of said system without necessitating simultaneous removal of filling material therefrom.

The pump device 152, which in the machine shown is of the dosing type operating intermittently and for each stroke supplying to the tube 10 a filling material charge for a package 13, comprises, on one hand, a pump proper consisting of a piston 156 and a vertical cylinder 157, on the other hand, a slide valve consisting of a slide 158 and a vertical valve chamber 159.

The valve chamber 159 is tubular and provided with three ports 160, 161 and 162 spaced along its length, one port 161 being positioned centrally between the two other ports and connected to the interior of the pump cylinder 157 by means of a pipe line 163. The upper port 160 connects to the supply line 151, the lower port 162 connecting to a filling material supply not shown by means of a pipe line 164.

By annular sealing flanges 165, 166 and 167 the slide 158 is divided into two sections of such lengths that the upper valve section defined between the flanges 165 and 166 corresponds to the axial spacing of the upper edge of the port 160 and the lower edge of the port 161 and hence to the same length spacing of the upper edge of the middle port 161 and the lower edge of the lower port 162, the lower valve section defined between the middle flange 166 and the lower flange 167 corresponding to the axial spacing of the lower edge of the middle port 161 and the lower edge of the lower port 162.

In normal operation the slide 158 is shiftable between an upper dead centre which is shown in FIG. 11 and in which the pump cylinder 157 communicates with the supply line 151, and a lower dead centre in which the filling material supply communicates with the pump cylinder 157.

The pump piston 156 has a downwardly extending piston rod 168 the free lower end of which, by a link 169, is connected to the free end of a substantially horizontal lever 170 the opposite end of which is secured to a spindle 171 parallel to the machine main shaft 77 and horizontally journalled in the machine frame base 1. A substantially vertical double-armed lever 172 is also secured to said spindle 171. At its upper free end said double-armed lever 172 is provided with a cam follower roller 173 co-operating with a cam disc 174 secured to the machine main shaft 77, the lower free end of the lever 172 being urged by a tension spring 175 mounted in the machine frame base to press the cam follower roller 173 against the cam disc 174.

A link 176 connects the lower end of the valve slide 158 to the free end of a substantially horizontal lever 177 the opposite end of which is secured to a spindle 178 parallel to the machine main shaft 77 and journalled in the machine frame base 1. One end of a lever 179 is secured to said shaft 178, its opposite end carrying a cam follower roller 180 co-operating with a positively guiding groove 181 in a cam disc 182 on the machine main shaft 77.

The entire pump mechanism is controlled in such manner that the valve slide 158, when the pump piston 156 is in its upper dead centre, will move downwardly from its upper working position to its lower working position. This will connect the pump cylinder 157 to the filling material supply. Subsequently, the pump piston 156 will move downwards to its lower dead centre to suck in a desired filling material quantity into the pump cylinder 157. As the pump piston 156 reaches its lower dead centre the valve slide 158 will reverse and move back into its upper working position connecting the pump cylinder 157 to the supply line 151. During the last phase of the operating cycle of the pump mechanism the pump piston 156 will move upwards to its upper dead centre and deliver, to the supply line 151, the filling material quantity sucked-in into the pump cylinder 157. Each such discharge will cause a corresponding quantity of filling material to leave the filling pipe 16 through the mouth valve 23 thereof. Between successive discharge strokes an unbroken filling material column is maintained in the supply line 151 and the filling pipe 16 thanks to venting valve 155 and the mouth valve 23 of the filling pipe 16.

To prevent operation of the plunger pump 156, 157 e.g. during a machine starting interval, when the tube 10 has not yet reached the level of the clamping jaws 11 and 12 but the machine main shaft 77 is rotating, an electromagnetic blocking device is arranged to disengage the cam follower roller 173 and the cam disc 174. Said blocking device comprises a catch lever 183 at one end hinged at a point above the machine main shaft 77 and having a point in the vicinity of its other end connected to an armature 185 of an electromagnetic relay 186 by a link 184. The dropping of the armature 185 will swing the catch lever 183 downwards into engagement with a stop surface 187 at the upper end of the double-armed lever 172, when said end is in its position corresponding to the pump piston 156 being in the upper dead centre position thereof, thereby to block the lever 172 in such inactive position until the armature 185 will again be attracted by electromagnetic coil of the relay. Thus, in normal operation the relay 186 is maintained constantly operated.

If, instead, the machine is to operate with continuous filling in the sense above identified the pump mechanism just described will be replaced by a continuously operating pumping system maintaining a substantially constant filling material level in the tube 10 above the level of the clamping jaws 11 and 12. The necessary modifications to be applied to the corresponding parts of the machine in such case are obvious to anyone skilled in the art.

For a better understanding of the time relationship of the various phases the machine operation cycle will be described in greater detail below. In such discussion it will be assumed that the preparatory steps have been completed and that, hence, the clamping jaws 11 and 12 have performed their transverse sealing movement and still are closed on the tube.

The next-following operating cycle is initiated by the pump 156, 157 starting to deliver the desired charge into the tube 10. Before the entire filling material charge has been supplied to the tube 10 the jaws 11 and 12 separate and move into their normal positions, and thereafter the helical winding of a package length of tube will start. The helical winding, the filling material supply and the position of the mouth of the filling pipe 16 are such as to maintain the filling pipe mouth below the filling material level in the tube 10 during the largest possible portion of the filling interval.

Upon completion of the helical winding phase the clamping jaws 11 and 12 reclose on the tube 10 fed downwards. Preferably, the filling operation is completed slightly beforehand to make possible the escape of any gas in the filling material charge before sealing the package 13. In almost immediate connection with the completion of the helical winding phase the return of the chain 68 and the unwinding of the web loop 86 are effected. Immediately upon the discharging stroke of the pump piston 156 there follows the suction stroke thereof so that the pump cylinder 157 will be filled for the next-succeeding discharging stroke.

The closing of the clamping jaws 11 and 12 will swing the seaming element 22 towards the tube 10 on the mandrel 9 to produce a seam as described above. Substantially simultaneously on one hand the supporting members 28 and 29 are swung inwardly towards the package 13 being formed below the clamping jaws 11 and 12 and on the other hand the shear cutters 14 and 15 are moved into their intermediate positions.

At least one of the clamping jaws 11 and 12 is provided with means for supplying sealing heat to the plastic coating of the transverse sealing zone defined by the clamping jaws 11 and 12. Such sealing heat may be generated e.g. by electrical heater loops in the clamping jaw or jaws, said heater loops, when supplied with current, heating a portion of the clamping jaw mass. The heating means might as well comprise electrical resistance strips on the working surfaces of the jaws, said strips being supplied with short current impulses when the clamping jaws 11 and 12 apply the sealing pressure to the sealing zone. If the web 5 per se or the inside face thereof comprises a polar plastic material, e.g. polyvinyl chloride, the clamping jaws 11 and 12 might as well serve as condenser plates and be connected in circuit with a high frequency generator thereby capacitively to heat the plastic material of the transverse sealing zone by high frequency current when closing the clamping jaws 11 and 12.

In connection with the sealing operation effected by the clamping jaws 11 and 12 the shear cutters 14 and 15 are caused to perform their cutting movement. Preferably, said cutting is carried out as late as possible to provide sufficient time for the transverse seal in which to cut to cool so as not to break open when the package 13 drops onto the take-off plate 32.

When the clamping jaws 11 and 12 have returned to their separated positions and have swung-away the seaming element 22 from the tube 10 on the mandrel 9 and the shear cutters 14 and 15 and the supporting members 28 and 29 have returned to their respective normal positions, the machine operation cycle has been completed. In order that a shut down of the machine shall stop the various mechanisms thereof in their positions corresponding to a completed machine cycle a microswitch 187 is connected in parallel with the main switch of the operating circuit of the drive motor 79. As obvious from FIG. 8, the microswitch 187 cooperates with a cam disc 188 on the main shaft 77. The microswitch 187 is open only when the cam disc 188 and thus the machine main shaft 77 assume a position corresponding to a completed machine cycle.

Although for sake of simplicity there has above been indicated that not only the just mentioned microswitch 187 but also the microswitches 89 and 90 are directly connected into the respective circuits, it is understood that they, if desired, may as well be connected via relays or the like and hence be incorporated in the operating circuits of these relays.

Preferably, the machine as described is adjustable for various package sizes. To this end the clamping jaw, cutting and package forming mechanisms should be dimensioned to take the largest tube diameter and package size in question. When adjusting the machine from one package size to another two possible cases may be contemplated, viz. (1) unchanged tube diameter and (2) changed tube diameter.

In case of unchanged tube diameter the package size may be varied through increasing the package length anyhow if the requirement on perpendicular transverse seals of each package is not maintained. First of all this change will require that the measuring wheel 88 and the belt pulley 54 are replaced and possibly that the shear cutters 14 and 15 are set to the desired cutting level by the turret 132 and are angularly displaced. Furthermore, if, when varying the package size, the filling material quantity of the packages is to be changed, replacement of the piston pump 156, 157 may be necessary.

In case of changed tube diameter the mandrel 9 and the seaming element 22 are replaced possibly in addition to the previously mentioned alterations. Furthermore, this case will require adjustment of the levels of the bracket 50 and the carriage 61, readjustment of the web edge guiding means 13 as well as adjustment of the folding members 24 and 25 in correspondence to the new tube diameter.

Of course it is assumed that the seaming element 22 and/or the clamping jaws 11 and 12 are replaceable by corresponding means adapted for other heating systems. Thus, if the machine in its standard version is adapted for seaming element 22 and clamping jaws 11 and 12 of the constant heat type it should be easily adjustable to impulse or high frequency heating of the seaming element 22 and/or the clamping jaws 11 and 12 through replacement of such parts and connection of any suitable heating system.

Particularly if the machine is to package food-stuffs as milk etc. it is necessary for hygienic reasons that the filling system should easily lend itself for cleaning. For that purpose, at least when disconnected from the link 156, the valve slide 158 is settable into a flushing position in which the annular flange 165 thereof is situated slightly above the port 160 the flanges 166 and 167 being opposite the ports 161 and 162, respectively. In such position the valve slide 158 permits concurrent flushing of the feed line 164, the connecting line 163, the pump cylinder 157, the valve chamber 159, the supply line 151 and the filling pipe 16 by any suitable washing liquid.

As mentioned in the introduction the packaging material sensing controlling the package forming might, instead of as a measuring of a distance along the packaging web material corresponding to package length, be carried out as a measuring of the corresponding length of the already finished tube. In such case a length measuring member corresponding to the means 87 should be positioned in a point along the mandrel 9 and be arranged to sense an axial tube length.

However, it is also possible to have index or registration marks pre-applied to the packaging web material control the package forming in such a manner that the spacing between two successive index or registration marks is sensed photo-electrically. This will make possible the production of packages having so-called registered printing or design since the print or the design in itself may comprise or furnish the indices necessary. The sensing of the indices in question may be carried out either on the web 5 or the tube 10.

I claim:

1. Apparatus for producing filled and sealed tetrahedron-shaped packages which comprises a supply roll of heat-sealable packaging material in web form, means acting intermittently for pulling off from said supply roll a predetermined web length, a mandrel, means acting intermittently for forming said pulled off lengths of said web into a continuous tube by winding the same helically upon said mandrel and for simultaneously advancing the same longitudinally, said tube being rotated through an angle of substantially 90° for each intermittent helical winding operation thereof, means cooperative with said web for guiding the same along a helical path which is fixed relative to the axis of said mandrel, a filling pipe having one end thereof inserted through said mandrel for introducing filling material into said tube, a feed pump for filling material connected to the other end of said filling pipe, length sensing means cooperative with said packaging material as it travels through said apparatus, means responsive to said sensing means for controlling said operation of said intermittently acting means by which said pulled off web lengths are formed into a continuous tube, a pair of clamping jaws, means actuating said clamping jaws to and from each other when said tube is stationary between intermittent operations of said tube forming means for deforming said tube wall inwardly and sealing the same in planes extending transversely through the tube axis, means also displacing said clamping jaws in a direction axially of said tube but in a direction opposite to its direction of movement simultaneously with deformation of said tube thereby to compensate for a reduction in tube length caused by deformation thereof, and severing means intermittently actuated when said tube is stationary for cutting off said filled and sealed tetrahedron-shaped packages at the portions sealed by said clamping jaws.

2. Apparatus as defined in claim 1 for producing filled and sealed tetrahedron-shaped packages wherein said mandrel is stationary and has a circular-cylindrical configuration and said intermittently acting tube forming means for helically winding said pulled-off web lengths comprises an intermittently driven endless belt looped heically around said mandrel and which engages the surface of said web in a helical driving manner.

3. Apparatus as defined in claim 1 for producing filled and sealed tetrahedron-shaped packages and which further includes means for adjusting said endless belt along the common tube and mandrel axis without disturbing the helical pitch of said belt.

4. Apparatus as defined in claim 1 for producing filled and sealed tetrahedron-shaped packages and which further includes means acting upon one marginal edge portion of said web in advance of the helical winding thereof to fold over the same towards its outside so as to overlie the other marginal edge thereof and thereby join the inside faces of the overlying marginal edge portions together when said web is wound helically.

5. Apparatus as defined in claim 1 for producing filled and sealed tetrahedron-shaped packages wherein said intermittently acting means for forming said pulled-off lengths of said web into a continuous tube includes a longitudinally seaming device actuated intermittently into working position and which applies heat and pressure to join together the web margins of said pulled-off lengths on said mandrel.

6. Apparatus as defined in claim 1 for producing filled and sealed tetrahedron-shaped packages and which includes means for effecting intermittent operation of said feed pump and hence intermittent discharge of filling material into said tube.

7. Apparatus as defined in claim 1 for producing filled and sealed tetrahedron-shaped packages and which further includes means carried by one of said clamping jaws and arranged at a distance corresponding substantially to a package length above the transverse sealing level to produce buckling folds respectively in said tube from opposite sides thereof.

8. Apparatus as defined in claim 1 for producing filled and sealed tetrahedron-shaped packages and which further includes supporting means located intermediate said clamping jaws and said severing means and actuatable to engage opposite sides respectively of the package being sealed.

9. Apparatus as defined in claim 8 for producing filled and sealed tetrahedron-shaped packages and wherein said supporting means are actuated by said severing means.

10. Apparatus as defined in claim 1 for producing filled and sealed tetrahedron-shaped packages wherein said severing means is constituted by a pair of shear cutters.

References Cited in the file of this patent

UNITED STATES PATENTS 2,741,079    Rausing _____ Apr. 10, 1956